United States Patent [19]

cottis et al.

[11] Patent Number: 5,286,793
[45] Date of Patent: Feb. 15, 1994

[54] IN SITU COMPATIBILIZATION OF PPE/POLYETHYLENE COPOLYMER BLENDS

[75] Inventors: Steve G. cottis, Hightstown; Kavilipalayam M. Natarajan, North Brunswick, both of N.J.

[73] Assignees: Istituto Guido Donegani, Milan, Italy; Enichem America, Inc., Monmouth Junction, N.J.

[21] Appl. No.: 898,829

[22] Filed: Jun. 15, 1992

[51] Int. Cl.⁵ .................. C08L 71/12; C08L 33/02
[52] U.S. Cl. .................... 525/132; 525/390; 525/905
[58] Field of Search .............. 525/132, 390, 905

[56] References Cited

U.S. PATENT DOCUMENTS

| | | | |
|---|---|---|---|
| 3,375,228 | 3/1968 | Holoch et al. | 525/397 |
| 4,048,143 | 9/1977 | Hay et al. | 525/397 |
| 4,165,422 | 8/1979 | White | 525/390 |
| 4,590,241 | 5/1986 | Hohlfeld | 525/132 |

FOREIGN PATENT DOCUMENTS 57-168938 10/1982 Japan.
63-108046 5/1988 Japan.
63-122755 5/1988 Japan.

*Primary Examiner*—James J. Seidleck
*Assistant Examiner*—Thomas Hamilton, III
*Attorney, Agent, or Firm*—Oblon, Spivak, McClelland, Maier & Neustadt

[57] ABSTRACT

Polymer compositions containing a polyphenylene etherpolyolefin copolymer obtained by melt mixing an ethylene/(alkyl)acrylic acid copolymer with a polyphenylene ether or an ester end-capped polyphenylene ether. The compositions are used in many commercial applications requiring high temperature resistance including formation of films, fibers and molded articles with excellent surface appearance.

15 Claims, 1 Drawing Sheet

IN SITU COMPATIBILIZATION OF PPE/POLYETHYLENE COPOLYMER BLENDS

BACKGROUND OF THE INVENTION

1. Field of the Invention

The present invention is directed to novel polyphenylene ether-polyethylene copolymer blends prepared by reactive melt blending of polyphenylene ether or an ester end-capped polyphenylene ether with an ethylene-acrylic acid copolymer.

2. Discussion of the Background

The polyphenylene ether resins (PPE) constitute a family of high performance engineering thermoplastics possessing outstanding properties, such as relatively high melt viscosities and softening points, which make them useful for many commercial applications. More precisely, PPE resins are suitable for many commercial applications requiring high temperature resistance and including formation of films and molded articles.

Among the most important characteristics of PPE resins are excellent hydrolytic stability, dimensional stability, toughness, heat resistance and dielectric properties.

On the other hand, PPE resins, although displaying the above-mentioned desirable properties, are also endowed with certain unsatisfactory properties which render them undesirable for many commercial uses. For example, films and fibers can be formed from polyphenylene ether resins on a commercial scale using solution techniques but melt processing is commercially limited because of the high temperatures required to soften the PPE resins which cause instability and changes in the polymer structure. Further, PPE polymers tend to degrade and to grow dark during melt processing.

Moreover, PPE resins are brittle due to their poor impact strength and limited in tensile properties and they are endowed with poor solvent resistance as well, and therefore cannot be used in applications, such as automotive applications where the parts will be exposed to chemicals, such as gasoline, grease and detergents. Therefore, there is a continuing search for improving the deficient characteristics of PPE particularly workability and solvent resistance.

In order to improve molding properties and impact strength, polyblends of polyphenylene ether resins with styrene resins have been employed. Thus U.S. Pat. No. 3,363,435 discloses that PPE can be mixed with polystyrene (PS) in all proportions to give blends with a good combination of properties and enhanced molding properties. However, the range of application of PPE-PS blends is still limited due to poor solvent resistance, i.e., they are unsuitable in fields requiring resistance to oils and gasoline.

In order to overcome the poor solvent resistance of PPE a number of blend compositions of polyolefins and PPE have been proposed. For instance U.S. Pat. No. 3,361,851 reported blends of PPE with small quantities (up to ten percent) of polyethylene (PE) which result in some improvements in both the impact strength and solvent resistance of PPE.

Other PPE-PE blends displaying a better set of properties with reference to PPE resins alone have been disclosed in U.S. Pat. No. 4,166,055, Japanese Patent Publication No. 7069/67, Japanese Patent Application Nos. 71,158/78 and 88,960/79.

It has been shown that polyolefins, particularly polyethylene (PE), even when added in small amounts, can noticeably change some characteristics of the PPE and therefore constitute an excellent component at very low price in the binary blends with PPE and in ternary blends with PPE and PS resins. Preferred amounts of PE in such blends range from 1 to 10% by weight (U.S. Pat. Nos. 3,361,851; 4,584,334), and are sufficient to improve their impact and cracking resistance.

Moreover PE acts as a plasticizer for PPE and the resulting blends are endowed with enhanced workability and better surface appearance (U.S. Pat. No. 3,809,729; DE 57,139,140; U.S. Pat. Nos. 4,145,377; 4,584,334).

Among other properties which are improved by adding small amounts of PE, the most important is the oxidation resistance of the melted PPE blends. PPE resins containing small amounts of polyethylene do not grow dark during melt processing.

Nevertheless, PPE-PE blends fail to take full advantage of organic solvent resistance inherent in polyolefins because either the amount of the polyolefin is too small or PPE and PE resins are not very compatible at higher compounding ratios exceeding 3-5% by weight of PE. The same incompatibility has been observed in PPE blends with high molecular weight polyolefins. In compositions composed of polyphenylene ether and either high molecular weight polyolefin or polyolefin exceeding 3-5% by weight, the two polymers are not uniformly mixed with each other and form a "sea-island" structure according to U.S. Pat. No. 4,460,743. Consequently, the resulting composition is fragile and has reduced mechanical strength and impact strength. When injection molded, the two polymers tend to agglomerate in the direction of the resin stream due to their essentially poor compatibility with each other and the resulting moldings are delaminated in a laminar state, thus being unsuitable for practical use. The use of lower molecular weight polyolefins do not solve the problem of the incompatibility either.

One way to overcome these drawbacks and increase the amount of compatible PE in PPE-PE blends is to add styrene (co)polymers or block copolymers of styrene and a conjugated diene as compatibilizers of the same blends. In the Japanese Patent Application No. 76547/85 it has been asserted that using a styrene-butadiene block-copolymer as a compatibilizer, the compatibility between PPE and PE resins can be improved up to 20% by weight of PE. Similar results have been disclosed in Japanese Patent Applications Nos. 71158/78, 88960/79 and 100159/84.

Although these compositions show improvements in molding properties, they fail to take advantage of the organic solvent resistance inherent to polyolefins from the point of view that the compounding ratio of the polyolefin in the composition is still too small or that the continuous phase is PPE or PPE-PS. Moreover, blends of PPE with block-copolymers of styrene have limitations to their use due to their inferior stiffness and tend to exhibit delamination (U.S. Pat. No. 4,322,507).

A second and probably preferred method of compatibilization of PPE with PE, is the use of PPE-PE copolymers. When present in the blend, these copolymers serve as compatibilizers for the uncopolymerized constituents, namely PPE and PE (U.S. Pat. Nos. 5,010,144; 4,460,743). Moreover, it has been shown that PPE-PE (grafted) copolymers can be compounded with styrene resins and give rise to perfectly compatible compositions (U.S. Pat. No. 4,460,743).

Several ways to obtain copolymers (or grafted copolymers) of PPE with PE have been so far proposed. In U.S. Pat. No. 4,460,743 a polyphenylene ether-grafted polyolefin has been disclosed which has been obtained by reacting a glycidylated PPE with a polyolefin having anhydride groups or conversely by reacting a polyphenylene ether having anhydride groups with a glycidylated polyolefin. In U.S. patent application No. 07/351,905 PPE-PE copolymers have been obtained by reaction of a functionalized olefin polymer with a PPE which has been previously capped with an epoxychlorotriazine. A similar method giving the same copolymers is described in U.S. Pat. No. 5,010,144.

An even more complicated way to obtain PPE-PE copolymers or grafted copolymers has been disclosed in U.S. Pat. No. 4,914,153. According to this patent PPE-PE graft copolymers are obtained "in situ" by melt-kneading a modified (with maleic anhydride) polyphenylene ether with modified (with maleic anhydride) polyolefin and in the presence of a binder such as phenylenediamine.

It is apparent that all the proposed methods of compatibilizing PPE with PE resins are more or less complicated and expensive.

Therefore the problem of obtaining stable and compatible PPE compositions endowed with better processability and impact properties together with outstanding solvent resistance still exists.

Furthermore, the problem still exists of obtaining PPE resins containing PE polymers in such amounts as to display superior properties without any loss of compatibility between the components and still more without the need of adding considerable amount of compatibilizers such as styrene (co)polymers or blockpolymers.

SUMMARY OF THE INVENTION

One object of the present invention is, therefore, to solve these problems and to provide PPE compositions having excellent processability together with outstanding solvent resistance and melt stability without any loss in the compatibility of their components.

A further object is to provide PPE compositions which do not undergo the observed catastrophic delaminations and reductions in mechanical strength when undergoing shear stress upon molding or other melt mixings.

This and other objects which will become apparent from the specification have been achieved by the present polyphenylene ether compositions which are based on an in situ formed polyphenylene ether-polyethylene/acrylic acid (EAA) graft copolymer (PPE-gPE) blend which has been obtained from the reactive melt mixing of (A) PPE or an ester end-capped PPE with (B) an ethylene-acrylic acid random copolymer.

DETAILED DESCRIPTION OF THE PREFERRED EMBODIMENTS

Figure 1:
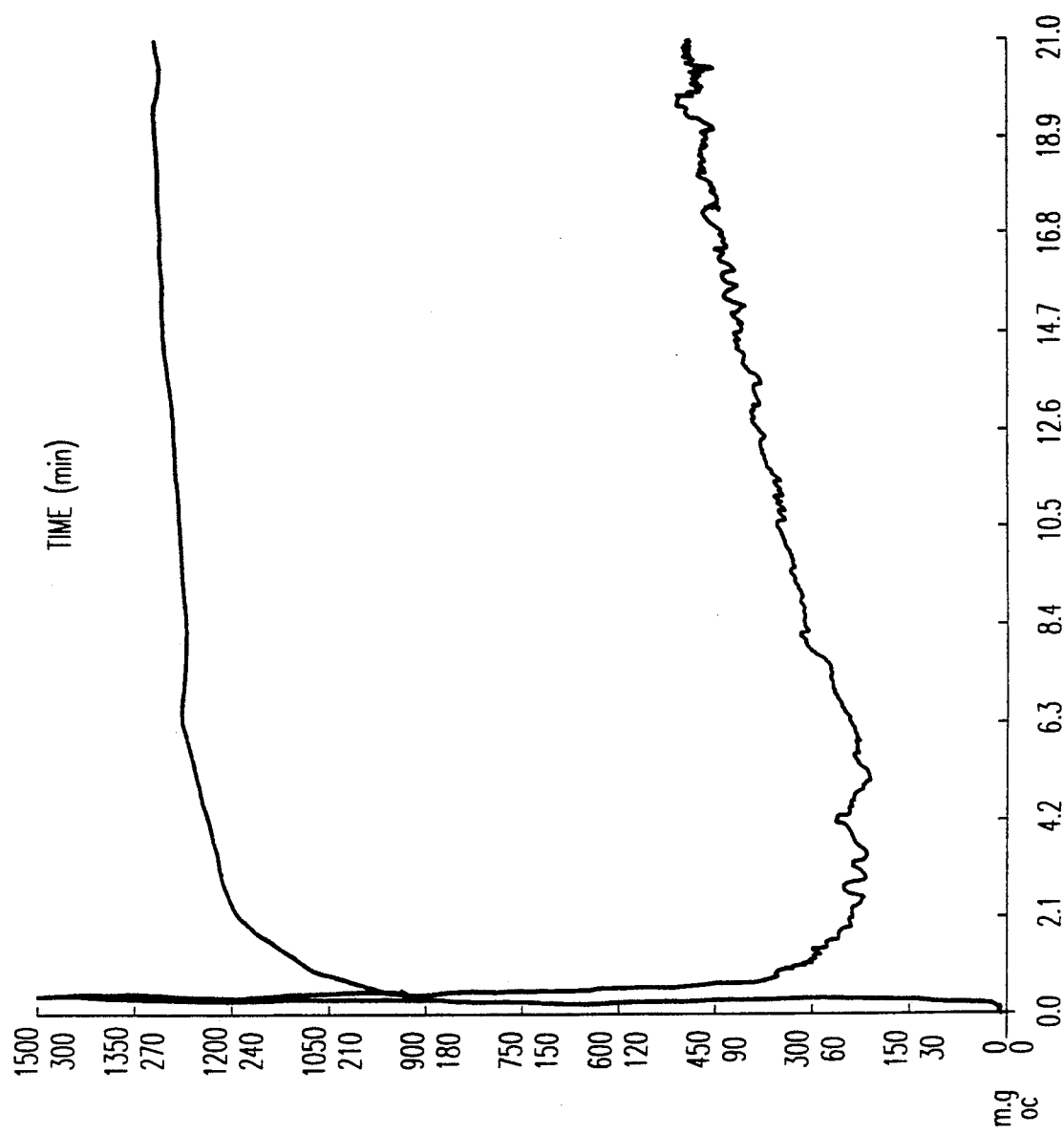
FIG. 1 shows the torque versus time plot for an ethylene-acrylic acid copolymer heated at 270° C. in a HAAKE mixing rheometer.

The compatible PPE/EAA copolymer blend of the present invention, obtained by the reactive melt mixing of the two polymers (A) and (B) may be made from only the two starting polymeric components, or may be present together with other polymers. The most suitable additional polymers are styrenic polymers whose compatibility with the PPE components of the blend of the present invention is excellent. Other polymers, such as PPE, PE or EAA may also be part of the blends. When PPE, PE or EAA are present together in the blends their compatibility is provided by the presence of the reactive PPE/EAA blend of the present invention.

The in situ formed copolymer blends of the present invention, in addition to their use as thermoplastic resins endowed with high temperature resistance together with excellent solvent resistance, may be used as compatibilizers in the formation of blends with other polymers.

The blends of the present invention can be used in many commercial applications requiring high temperature resistance, including formation of films, fibers and molded articles with excellent surface appearance. The molded products range from parts and housings for household appliances to internal and external decorative parts of automobiles, including components for automobiles, body panels, parts and housings of electrical and electronic products. More generally the compositions of the present invention can be used in every engineering plastic application where a good balance between impact and heat resistance, excellent appearance and moldability are required.

According to the present invention, there are provided compositions comprising thermoplastic resins derived from the reactive melt mixing of a two polymer mixture of:

A) 40 to 80%, preferably about 50–70%, by weight of a PPE or ester end-capped PPE, and B) 20 to 60%, preferably about 30–50% by weight of an ethylene-acrylic acid random copolymer containing from 0.1 to 5 mol percent acrylic acid.

The compositions of the present invention are obtained as follows. The PPE or ester end-capped PPE and the ethyleneacrylic acid copolymer in the required compounding ratio, i.e., in a ratio A/B of from 40/60 to 80/20 by weight, preferably 50/50 to 70/30, are reactive melt blended in a mixer (e.g. in a HAAKE-BUCHLER mixer) for a period of time ranging from 5 to 40 minutes and at a temperature from 260° to 315° C. depending on the capacity of the mixer. Preferably, the melt blending is accomplished at about 290°–315° C. for about 10–30 minutes depending on mixing capacity, catalyst, etc.

Reactive melt blending of polymers A and B produces a compatible polymer blend in which the PPE is to some extent covalently bonded to the EAA. Additionally, the PPE is dispersed in a EAA matrix as small droplets having an average particle size of 0.1–2 microns, preferably about 0.5–1 microns in diameter. The covalent bonding of the PPE to the EAA and the small particle size of the PPE dispersed in the EAA are believed to provide the improved compatibility and solvent resistance of the present blends.

The melt blending of the two polymeric components A and B is preferably, but optionally, carried out in the presence of an antioxidant (about 0.1 to 0.4% by weight), and in presence or absence of catalyst.

The melt reaction between polymers A and B results in an increase in molecular weight and melt viscosity and this in turn produces an increase in torque during mixing. This increase in viscosity is temperature dependent (See Table 3). The increase in melt viscosity of the EAA copolymer occurs by intramolecular anhydride formation by dehydration of some of the carboxyl groups of the EAA. A pressed film of the product obtained from the heat treatment of EAA alone shows an anhydride carbonyl stretching band at 1810 cm$^{-1}$ and a C-O bending band at 1025 cm$^{-1}$. This is close to the absorption bands at 1812.5 cm$^{-1}$ and 1020 cm$^{-1}$, respectively, of isobutyric anhydride, which has a similar structure around the anhydride group as shown below.

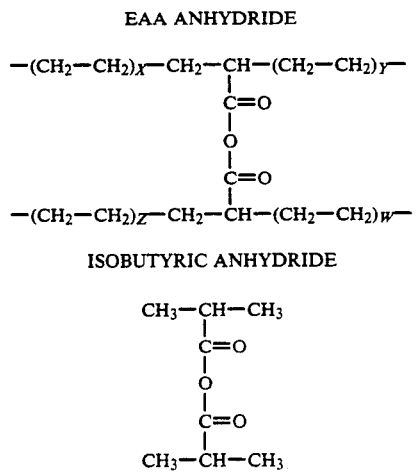

Experiments show that under the conditions used to form the compatible blends of the invention, the EAA, when heated alone, shows an increase in melt viscosity (See Table 3). The ethylene-acrylic acid copolymer network obtained in the present invention contains intermolecular carboxylic acid anhydride bonds and has a torque of 300-1,000 m.g at 285° C. when measured in a HAAKE-BUCHLER HBI SYSTEM 90 mixer having an internal volume of 69 cm$^3$. Mixing the ethylene-acrylic acid copolymer at conventional temperatures of about 150° C. is insufficient to form the required anhydride bonds or obtain the higher torque values of the present invention. The high torque values obtained for the EAA copolymer network correspond to substantially increased molecular weights and melt viscosities for the EAA copolymer network of the present invention relative to EAA which has been mixed at lower temperatures.

FIG. 1, shows the torque generated in a HAAKE mixing rheometer heated at 270° C. for an ethylene-acrylic acid copolymer. In FIG. 1, the lower curve is the torque generated during the mixing and the upper curve shows a gradual increase in temperature during mixing. At mixing times less than about six minutes, the torque is only about 250 m.g. At 6.3 minutes mixing time, a torque of 275 m.g. is obtained at a temperature of 273° C. After about 6.3 minutes, the torque increases steadily, accompanied by gradual increases in temperature. The increasing torque indicates increasing molecular weight and increasing viscosity. Samples of polymers produced by mixing times greater than about 6.3 minutes show the presence of intramolecular anhydride bonds which are not present when the EAA copolymer is mixed at lower temperatures and/or shorter mixing times.

The EAA copolymer network of the present invention can be produced by melt mixing EAA for about 6 minutes at a temperature of at least 275° C. Preferably, the EAA is mixed for longer times ranging from about 6 minutes to about 30 minutes, preferably about 10-20 minutes at temperatures ranging of about 270°-320° C., preferably about 280°-310° C. to obtain intramolecular anhydride bond formation. Obviously, the EAA copolymer network of the present invention can also be produced by heating the EAA copolymer at temperatures above 320° C., but below the decomposition temperature of the EAA copolymer for times less than 6 minutes so long as intramolecular anhydride bonds are formed. One having ordinary skill in the art, can readily adjust the time and temperature conditions of the melt-mixing process to form the required intramolecular anhydride bonds. Formation of anhydride bonds can be readily determined by conventional film infrared spectroscopy to determine the presence of anhydride carbonyl stretching and bending bands as indicated above.

While not being limited by any particular theory, compatibility of the blend may be aided by the fact that the viscosity of the reacting EAA component actually becomes higher than the PPE at temperatures above 280° C. and the dispersed PPE droplets are then fixed into this morphology by the higher viscosity of the reacting EAA and become covalently bound to the EAA as dispersed droplets. This is similar to use of semi-penetrating networks (SIPN's) to form compatible blends between a thermoplastic resin and in situ cross-linked polymer. See *Polymer Blends*, J. A. Mason and L. H. Sperling, pages 260-262, Plenum Press, New York and London, 1981.

Reaction between PPE and the EAA copolymer (B) forms a copolymer (C) which is believed to contribute to the formation of compatible blends. It is believed that a reaction occurs between the OH groups of PPE or the ester end groups of the ester end-capped polyphenylene ether (A) and the reactive anhydride and/or acid groups of the ethylene-acrylic acid copolymer (B) producing product (C). Polymer (A) has the structure —[X]—$_p$OH or —[X]—$_p$O—C(O)—Y where Y is an alkyl, aryl, or aralkyl group and X has the following structure.

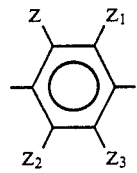

Copolymer (B) has the structure

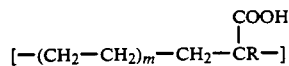

where R is an alkyl group. Reaction of polymer (A) with copolymer (B) produces a product polymer (C) having the following ester structure.

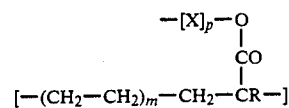

In compounds A, B and C, the substituents Z, $Z_1$, $Z_2$, and $Z_3$ have the meanings given below, where m is the number of ethylene monomer units per acrylic acid unit in the random copolymer (B) and m is a number from 20 to 1000. R is hydrogen or alkyl of from 1 to 4 carbon atoms, preferably methyl. Evidence is presented in Table 2 showing that the use of ester-capped PPE instead of uncapped PPE increases the reaction temperature and/or melt viscosity during the reactive mixing, at shorter reaction times or at lower temperatures.

The use of a catalyst reduces the average particle size of the PPE particles which are dispersed in the EAA from several microns in diameter to about 0.5-2 microns in diameter, preferably 0.5-1 microns in diameter. Further, use of a catalyst produces higher torque values during melt mixing. Higher torque values indicate the formation of higher molecular weight compounds and increases in viscosity which are associated with improved compatibility and solvent resistance.

As a catalyst, any compound which catalyzes esterification reactions between the OH end-groups of uncapped PPE or the ester groups of the end-capped PPE with the COOH groups of EAA may be used. Examples of suitable known catalysts include metal salts, such as sulfates, titanates, stanates, etc., as well as metal salts of organic carboxylic acids, i.e., $C_{1-10}$ alkanoic acids. Metal salts containing alkali and alkaline earth metal cations are preferred. The metal salts may be used as the anhydrous salt or, alternatively, may be hydrated. A particularly preferred catalyst is magnesium acetate tetrahydrate. Additional catalysts which are suitable for use in the present invention are described in GB 2,150,580. Experiments show that use of catalysts such as magnesium acetate or sodium acetate may aid in the anhydride formation of the EAA as mentioned above.

The thermoplastic blend, i.e. PPE/EAA melt reacted blend, can be used alone as a molding compound or is optionally compounded with other conventional components such as fillers, flame retardants, etc. and occasionally with other suitable polymers such styrene resins, PPE and/or PE. These additional polymers may be added in varying amounts according to the desired application, generally 0.5-95 wt. % of the composition. The compounding can be carried out by various known methods generally employed for blending resins with compounding agents.

PPE and ester end-capped PPE are well known reactive polymers. End-capped PPE is described in U.S. Pat. Nos. 4,806,602, 4,048,143 and 3,375,228 and is generally prepared by reaction of a polyphenylene ether with at least one carboxylic acid anhydride in the presence of a catalyst and at a temperature in the range of approximately 170°-300° C. U.S. Pat. Nos. 4,806,602, 4,048,143 and 3,375,228 are incorporated herein by reference in their entirety for a more complete description of the ester end-capped PPE which can be used in the present invention. Benzoate end-capped PPE is particularly preferred.

The benzoate end-capped PPE of the present invention can be readily prepared by reacting the terminal hydroxyl (OH) groups of PPE with benzoyl chloride in chloroform followed by precipitation of the end-capped polymer with methanol addition. Typically benzoate end-capped PPE has 30-70% of the available hydroxyl (OH) groups end-capped as benzoate groups (U.S. Pat. No. 4,822,836). A suitable process for preparing the benzoate end-capped polyphenylene ether of the present invention is described, for example, in US 4,822,836 which is incorporated herein by reference for a more complete description of a method of preparing the benzoate end-capped PPE.

Polyphenylene ether resins are well known polymers. They are generally obtained via oxidative coupling of one or more and different phenols and in presence of suitable catalysts. The preferred polyphenylene ethers (PPE) have the formula

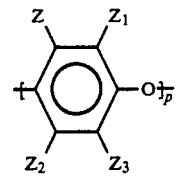

where $Z$, $Z_1$, $Z_2$ and $Z_3$, which may be the same or different, are monovalent substituents, independently selected from the group of hydrogen, halogen (Cl, Br, I, F), hydrocarbon groups containing from 1 to 4 carbon atoms, and phenyl; p is the total number of monomer units and is a positive integer of 20 or more. Preferably, the substituents $Z$, $Z_1$, $Z_2$ and $Z_3$ are $C_{1-6}$ alkyl groups. The ether oxygen atom per unit is connected to the phenyl ring of the next monomer unit.

Typical examples of suitable polyphenylene ethers are:
poly(2,6-dimethyl-1,4-phenylene)ether;
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2,3,6-trimethyl-1,4-phenylene)ether;
poly(2-chloro-1,4-phenylene)ether;
poly(2-bromo-1,4-phenylene)ether;
poly(2-phenyl-1,4-phenylene)ether; and
poly(2,6-dichloro-1,4-phenylene)ether.
Preferably, poly(2,6-dimethyl-1,4-phenylene)ether is used. Copolymers, such as a 2,6-dimethylphenol/2,3,6-trimethylphenol copolymers can also be used.

Processes for producing these polyphenylene ethers are known and described for example in U.S. Pat. Nos. 3,306,874; 3,306,875; 3,257,357; 3,257,358. These U.S. patents are incorporated herein by reference for a more complete description of suitable PPE which can be used in the present invention.

Moreover, the PPE resins which can be used in the present invention, include polymers having monomer units of the formula

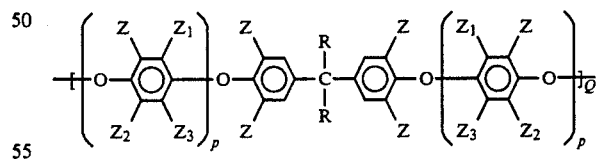

or

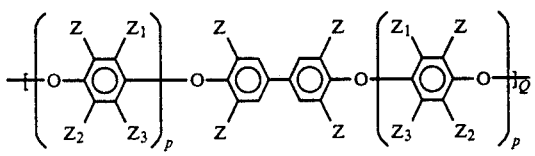

where $Z$, $Z_1$, $Z_2$, $Z_3$, R and p have the meanings given above and Q, which is the same or different from p, represents the total number of the monomer units in the brackets and is a positive integer of 20 or more. These PPE resins are described, for example, in "Die Makromolekulare Chemie, 186, 1835-1853, (1985). The most frequently used PPE resin among those corresponding to the structural formulas shown above, is the copolymer obtained by reacting tetramethylbisphenol-A with 2,6-dimethyl-phenol.

Preferred polyphenylene ethers have a weight average molecular weight ranging from 10,000 to 100,000. Preferred molecular weights are within the range of 30,000–60,000.

Ethylene-(alkyl)acrylic acid random copolymers (EAA) are well known polymers and are generally obtained via radical polymerization. Patents describing their synthesis, include DE 1,570,560; DE 1,570,612 and U.S. Pat. No. 4,988,781. U.S. Pat. No. 4,988,781 is incorporated herein by reference for a more complete description of ethylene-(alkyl)acrylic acid copolymers which can be used in the present invention. The most preferred ethylene-(alkyl)acrylic acid copolymers have an (alkyl)acrylic acid content of from about 0.1 mol to about 5 mol percent and have a weight average molecular weight in the range of about 50,000 to about 150,000, preferably about 80,000–120,000. Preferred ethylene-(alkyl)acrylic acid copolymers are prepared from ethylene and $C_{1-6}$alkyl acrylic acid monomers, preferably acrylic acid and/or methacrylic acid. A particularly preferred EAA is made by Dow Chemical Co. and is commercialized under the tradename of PRIMACOR.

Table 1 shows the most important characteristics of Primacor copolymers. Any of these copolymers may be used in the present invention.

TABLE 1

Physical Properties of Select PRIMACOR Polymers for Film Extrusion

|  | PRIMACOR 1320 | PRIMACOR 1410-XT | PRIMACOR 1420 | PRIMACOR 1430 |
|---|---|---|---|---|
| Wt % comonomer (ASTM D-4094) | 6.5 | 9.5 | 9.5 | 9.5 |
| Melt index, d-g/min. (ASTM D-1238) | 2.5 | 1.5 | 3.0 | 5.0 |
| Density, g/cc | 0.932 | 0.938 | 0.938 | 0.938 |
| Vicat softening pt, °C. (°F.) (ASTM D-1525) | 85 (185) | 81 (178) | 78 (172) | 78 (172) |
| Tensile strength, psi (ASTM D-638) | 1200 | 1210 | 1385 | 1170 |
| Ultimate tensile strength (ASTM D-638) | 2825 | 3400 | 3580 | 3000 |
| Ultimate elongation, % (ASTM D-638) | 620 | 585 | 510 | 545 |

The relative amounts of polymer (A) and polymer (B) (PPE/EAA) which are melt blended to form polymer blend of the present invention are in the range from 70:30 to 80:20. When melt blending the ester end-capped PPE with EAA, it is preferable to select the amount of EAA such that an excess molar amount of acrylic acid units is present relative to the ester end-capped units. Polymers (A) and (B) are melt reacted at temperatures ranging from about 250°–315° C., preferably about 290°–315° C. for a time sufficient to form the compatible blend. Typical melt blending times range rom about 5 minutes to about 40 minutes, preferably about 10–30 minutes.

The thermoplastic resin obtained from the reactive melt mixing of the two starting polymers (A) and (B), consists of pure polyethylene acrylic acid copolymer and pure polyphenylene ether which are at least partially covalently bound and thus compatible. If the copolymer blends of the present invention are the only resin used for production of injection molded articles the final characteristics of the molded articles will have improved properties over the properties of the corresponding non-reacted physical blends of PPE and PE-/EAA.

The thermoplastic resins of the present invention provide perfectly compatible blends of PPE with EAA which display excellent solvent resistance together with a satisfactory stiffness, an excellent processability and impact properties.

The thermoplastic polymer blends of the present invention may be compounded with about 5–25% by wt of other resins such as PPE, PE, EAA or styrene resins. In addition to the above-described components, various additives may be also compounded provided that they do not impair the effects of the present invention, primarily the excellent compatibility of the components. The most important additives include stabilizers, antioxidants, releasing agents, plasticizers, flame-retarders, fillers, antistatics and colorants.

Compounding of the polymer blend with additional additives for preparing the blends of the present invention is preferentially performed after the reactive melt mixing of polymers (A) and (B). The additives may be added in one step or in two or more steps with repeated compounding as necessary.

For example, a first addition of antioxidant may be conducted during the first step, i.e., during the reactive melt mixing of the two polymers (A) and (B) to give the copolymer of the present invention. A second addition of components, e.g. releasing-agents and plasticizers, may be conducted after the reactive melt mixing. During this second addition step, other suitable resins may be added as well.

The compounding can be carried out be various methods generally employed for blending resins with compounding agents, such as stabilizers and antioxidants. For example the components in the form of powders, granules or in a mixed form, i.e. powder plus pellets, are uniformly dispersed in a mixer, (HENSCHEL mixer, HAAKE BUCHLER mixer, twin cylinder mixer, ribbon blender, etc.) provided that there is sufficient residence time for the reactive melt blending to occur and the mixture is then melt-kneaded by means of a kneader, e.g., a roll mill, a BANBURY mixer, a BRABENDER PLASTOGRAPH etc. The thus obtained resin composition may be extruded into pellets.

The resin composition of the present invention can be easily molded by molding processes commonly applied to thermoplastic resins, i.e. injection molding, extrusion molding, etc. Injection molding is particularly preferred.

Other features of the invention will become apparent in the course of the following descriptions of exemplary embodiments which are given for illustration of the invention and are not intended to be limiting thereof.

EXAMPLES

EXAMPLE 1—BENZOATE END-CAPPED PPE/EAA (50/50) COPOLYMER

Benzoate end-capped PPE, prepared in chloroform from PPE (Scientified Polymer Products, Inc.) and benzoyl chloride, and EAA (PRIMACOR from Dow Chemical Company) were melt mixed in a HAAKE BUCHLER mixer (capacity: 276.2 cm³) with roller blades. Microcomputer provisions on this equipment permit control of mixing variables. Temperature and screw speed in the mixer were set at 270° C. and 100 rpm respectively. After two minutes of initial mixing, about 0.25% IRGANOX 1076 (antioxidant) was added to the polymer melt and the mixing was continued for the set time of 30 minutes. Torque and temperature were monitored as function of time.

The melt reaction between the two polymers resulted in an increase in molecular weight and melt viscosity which was manifested as an increase in torque during mixing.

The resin obtained by melt mixing was then chipped in a THOMAS-WILEY laboratory mill. The compounded chips were dried for 3 hours at 110° C. prior to injection molding with an ENGEL injection molding machine. Test specimens such as tensile bars, flexural bars and disks were produced. The physical properties of these samples are shown in Table 1.

EXAMPLE 2—COMPARATIVE PPE/LDPE BLEND

A comparative composition was prepared by compounding 50 wt. % PPE (Scientific Polymer Products, Inc.) and 50 wt. % LDPE (high melt PETROTHENE from Quantum USI) on a LEISTRITZ extruder. The resin obtained was dried and molded as in Example 1. Physical properties of this comparative blend are shown in Table 1.

EXAMPLE 3—COMPARATIVE PPE/EAA BLEND 50 wt. % PPE and 50 wt. % EAA (PRIMACOR) were compounded on a LEISTRITZ extruder as in comparative Example 2. The compounded pellets were dried and injection molded as in Example 2. The properties of this comparative blend are shown in Table 1.

EXAMPLE 4—UNCAPPED PPE/EAA BLEND

The reaction of Example 1 was repeated with the uncapped PPE used in Example 2 in place of the benzoate end-capped PPE in triplicate runs, to produce good dispersions of PPE in an EAA matrix. A blend of the three HAAKE melt mixing runs was injection molded as in Example 1 and the properties were determined. The results are shown in Table 1.

EXAMPLE 5—UNCAPPED PPE/EEA (70/30) BLEND

In a manner similar to Example 4, 70 wt. % uncapped PPE and 30 wt. % EAA were compounded in a LEISTRITZ extruder at 270° C. for 30 minutes. The resulting product was injection molded as in Example 1. Properties of the resulting blend are shown in Table 1.

EXAMPLE 6—UNCAPPED PPE/EAA (70/30) BLEND 70 wt. % uncapped PPE and 30 wt. % EAA were melt mixed in a HAAKE torque rheometer at 290.C for 22 minutes. The final torque and temperature reached 3200 mg and 310° C., respectively. Physical properties of the resulting blend are shown in Table 1.

EXAMPLE 7—EFFECT OF CATALYST AMOUNT ON TORQUE DURING MELT MIXING 50 wt. % benzoate capped PPE and 50 wt. % EAA were melt mixed in a HAAKE mixer at 270° C. for 9 minutes with the amount of magnesium acetate catalyst shown in Table 2.

The data illustrated in Table 2 shows that increasing the catalyst concentration does not change the final temperature which is reached but increases the final torque reached. Scanning electronmicrographs showed that the 41% capped PPE/EAA mixture prepared with 0% catalyst contained PPE particles dispersed in EAA of a few microns in diameter. The use of catalyst gave a blend which contained PPE particles of about 1 micron diameter.

Obviously, numerous modifications and variations of the present invention are possible in light of the above teachings. It is therefore to be understood that within the scope of the appended claims, the invention may be practiced otherwise than as specifically described herein.

TABLE 1

| PROPERTY | PPE | PPE/EAA (50/50) (from Extruder) | PPE/EAA (50/50) (from HAAKE) | PPE/EAA (70/30) (from Extruder) | PPE/EAA (70/30) (from HAAKE) | PPE/EAA (50/50) (theoretical) | PPE/LDPE (50/50) Control 1 | Benzoate Capped (50/50) (from HAAKE) | EAA |
|---|---|---|---|---|---|---|---|---|---|
| tensile strength (psi) | 11,600 | 1,837 | 3,274 | 4,327 | 4,956 | 6,400 | 1,700 | 3,240 | 1,837 |
| tensile elongation (%) | 8 | 18 | 61 | 13 | 15 | — | 20 | 46 | 388 |
| flexural strength (psi) | 16,500 | 2,728 | 3,523 | 5,368 | 6,895 | — | 3,000 | 4,200 | 834 |
| flexural modulus (psi) | 390,000 | 76,723 | 77,737 | 148,588 | 171,408 | 215,000 | 60,000 | 94,000 | 15,547 |
| notched izod (ft. lbs) | 1.0 | 0.93 | 2.4 | 0.48 | 0.69 | — | 0.7 | 2.3 | 6.5 |
| Chemical Resistance tensile strength (psi) | 0 (cracked) | 1,821 | 3,237 | 4,347 | 4,852 | — | — | 3,400 | — |
| tensile elongation (%) | 0 (cracked) | 17 | 64 | 14 | 15 | — | — | 70 | — |

TABLE 2

PPE/EAA (50/50) Blending Experiments in Small HAAKE Mixer (capacity: 69.0 cm³) set temperature: 270° C.; mixing time: 9 minutes

| bz. capped PPE (%) | Mg(OAc)$_2$ (%) | Final Temp. (°C.) | Initial Tor. (mg) | Final Tor. (mg) | $\frac{(Tor^{max}-Tor_{min})}{Tor_{min}}$ |
|---|---|---|---|---|---|
| 0 | 0 | 278 | 358 | 508 | 0.42 |
| 0 | 0.34 | 289 | 369 | 670 | 0.82 |
| 41 | 0 | 285 | 317 | 458 | 0.44 |
| 41 | 0.16 | 291 | 338 | 681 | 1.01 |
| 41 | 0.16 | 291 | 338 | 681 | 1.01 |
| 41 | 0.34 | 291 | 390 | 748 | 0.92 |
| 41 | 0.34 | 286 | 426 | 702 | 0.65 |

TABLE 3

PPE/EAA (50/50) Blending Experiments - Effect of Blending Temperature on Final Torque and Microdispersion Morphology

| Blending Conditions | Microdispersion Morphology | Final Blending Temperature (°C.) | Final Torque (m.g) | Blending Time |
|---|---|---|---|---|
| Uncapped PPE, no catalyst, large HAAKE mixer (capacity 276.2 cm³) | Poor | 270 | 1500 | Initial mixture at 270° C. |
| Uncapped PPE, no catalyst, large HAAKE mixer (capacity 276.2 cm³) | Fair | 300 | 3400 | 30 minutes |
| Uncapped PPE, no catalyst, large HAAKE mixer (capacity 276.2 cm³) | Good | 310 | 6500 | 30 minutes |
| Uncapped PPE, no catalyst, small HAAKE mixer (capacity 69 cm³) | Poor | 270 | 360 | Initial mixture at 270° C. |
| Uncapped PPE, no catalyst, small HAAKE mixer (capacity 69 cm³) | Fair | 293 | 1350 | 21 minutes |
| EAA alone, small HAAKE mixer (capacity 69 cm³) | — | 270 | 280 | Initial mixture at 270° C. |
| EAA alone, small HAAKE mixer (capacity 69 cm³) | — | 285 | 580 | 21 minutes |
| EAA alone, small HAAKE mixer (capacity 69 cm³) | — | 295 | 150 | Initial melt at 295° C. |
| EAA alone, small HAAKE mixer (capacity 69 cm³) | — | 308 | 675 | 17 minutes |

Good: PPE droplets in EAA matrix having less than 1 micron diameter.
Fair: PPE droplets in EAA matrix having 1-5 micron diameter.
Poor: PPE droplets in EAA matrix having greater than 10 micron diameter.

What is claimed as new and desired to be secured by Letters Patent of the United States is:

1. A polymer blend prepared by reactive melt mixing a polyphenylene ether and an ethylene-(alkyl)acrylic acid copolymer, consisting of:
   A) 40 to 80% by weight of uncapped polyphenylene ether or ester end-capped polyphenylene ether wherein said uncapped polyphenylene ether or ester end-capped polyphenylene ether consists of repeating monomer units of the formula

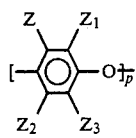

or

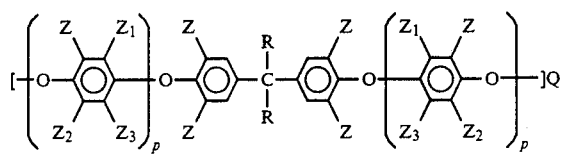

or

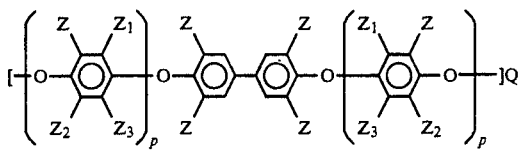

wherein Z, $Z_1$, $Z_2$ and $Z_3$, which may be the same or different, are monovalent substituents selected from the group consisting of hydrogen, halogen, hydrocarbon groups containing 1-4 carbon atoms and phenyl, R is hydrogen or $C_{1-4}$ alkyl and p and O are the number of monomer units and are positive integers of 20 or more,
   B) 20 to 60% by weight of an ethylene-(alkyl)acrylic acid random copolymer containing from 0.1 to 5 mol % acrylic acid monomer unit, and optionally
   C) an effective amount of an esterification catalyst.

2. The blend of claim 1, consisting of 50-70% by weight of said polyphenylene ether or ester end-capped polyphenylene ether and 30-50% by weight of said ethylene-(alkyl)acrylic acid random copolymer.

3. The blend of claim 1, wherein said reactive melt mixing is conducted for a period of time ranging from 5 to 40 minutes at a temperature from 260° C. to 315° C.

4. The blend of claim 1, wherein said reactive melt mixing is conducted for a period of time ranging from 10 to 30 minutes and at temperature from 290° C. to 315° C.

5. The blend of claim 1, wherein said ethylene(alkyl)acrylic acid random copolymer contains intermolecular anhydride bonds.

6. The blend of claim 1, wherein said polymer blend formed by said reactive melt mixing consists of polyphenylene ether covalently bonded to said ethylene-(alkyl)acrylic acid random copolymer through ester bonds.

7. The blend of claim 1, wherein said reactive melt mixing is conducted in the presence of an esterification catalyst.

8. The blend of claim 1, prepared by reactive melt mixing said uncapped polyphenylene ether with said ethylene(alkyl)acrylic acid random copolymer.

9. The blend of claim 1, prepared by reactive melt mixing said ester end-capped polyphenylene ether with said ethylene-(alkyl)acrylic acid random copolymer.

10. The blend of claim 1, wherein said ethylene(alkyl)acrylic acid random copolymer is an ethylene-acrylic acid random copolymer.

11. The blend of claim 1, wherein said ethylene(alkyl)acrylic acid random copolymer is an ethylene(meth)acrylic acid random copolymer.

12. The blend of claim 1, wherein said polyphenylene ether is dispersed as droplets having an average particle size of about 0.1-2 microns in diameter in said ethylene(alkyl)acrylic acid random copolymer.

13. The blend of claim 12, wherein said polyphenylene ether is dispersed as droplets having an average particle size of about 0.5-1 microns in said ethylene-(alkyl)acrylic acid random copolymer.

14. The blend of claim 1, wherein said ester end-capped polyphenylene ether is benzoate end-capped poly (2,6-dimethyl1,4-phenylene ether).

15. A molded article prepared by molding the polymer blend of claim 1.

* * * * *

UNITED STATES PATENT AND TRADEMARK OFFICE
CERTIFICATE OF CORRECTION

PATENT NO. : 5,286,793
DATED      : February 15, 1994
INVENTOR(S): Steve G. COTTIS, et al.

It is certified that error appears in the above-indentified patent and that said Letters Patent is hereby corrected as shown below:

On the title page, Item [19] and Item [75], the 1st inventor's last name should read as follows:

--Cottis--

Signed and Sealed this

Nineteenth Day of July, 1994

Attest:

BRUCE LEHMAN

*Attesting Officer*   *Commissioner of Patents and Trademarks*